(12) United States Patent
Divine (10) Patent No.: US 7,485,793 B1
(45) Date of Patent: Feb. 3, 2009

(54) MUSIC DISPLAY DEVICE AND METHOD

(76) Inventor: Sean Divine, 14033 36th Ave. NE., Seattle, WA (US) 98125

( * ) Notice: Subject to any disclaimer, the term of this patent is extended or adjusted under 35 U.S.C. 154(b) by 103 days.

(21) Appl. No.: 11/735,472

(22) Filed: Apr. 15, 2007

Related U.S. Application Data (60) Provisional application No. 60/744,968, filed on Apr. 17, 2006.

(51) Int. Cl.
*G09B 15/00* (2006.01)
(52) U.S. Cl. .................................................. 84/470 R
(58) Field of Classification Search ............... 84/470 R, 84/471 R, 473, 474, 475, 471 SR, 476

See application file for complete search history.

(56) References Cited

U.S. PATENT DOCUMENTS 5,709,552 A * 1/1998 LeGrange .................... 434/404

\* cited by examiner

*Primary Examiner*—Kimberly R Lockett (57) ABSTRACT

A display device includes a first planar surface and a second planar surface divided into a plurality of adjacent sectors, the second planar surface attached concentrically and rotatable with respect to the first planar surface, the second planar surface including at least one display window to reveal at least one portion of the first planar surface bearing harmonica note location indicia and/or harmonica position indicia corresponding to use of a harmonica, the at least one display window to reveal the harmonica note location indicia and/or the harmonica position indicia upon a substantial alignment of a sector of the first planar surface with a sector of the second planar surface.

23 Claims, 8 Drawing Sheets

MUSIC DISPLAY DEVICE AND METHOD

CROSS-REFERENCE TO RELATED APPLICATIONS

This application claims the benefit of and priority to the co-pending U.S. Provisional Application Ser. No. 60/744,968, filed Apr. 17, 2006, entitled "Music Display Device and Method" the entirety of which is incorporated herein by reference.

FIELD OF THE INVENTION

The invention relates to a music display device for musicians, in particular, a device that can be used by a musician to display musical relationships with respect to harmonica playing positions and note locations, harmonica keys, and song keys.

DESCRIPTION OF THE RELATED ART

A scale is a group of pitches (scale degrees) arranged in ascending order. These pitches span an octave. Scale degrees include the tonic or root note (the key of a song), supertonic, mediant, subdominant, dominant, submediant, subtonic, and leading tone. Scales can begin on each degree representative of scale modes which include ionian, dorian, phrygian, lydian, mixolydian, aeolian, and locrian modes. Two or more pitches played contemporaneously are chords which can include major chord, minor chord, augmented chord, diminished chord, sixth chord, seventh chord, suspended chord, extended chord and polychord. Two or more successively played chords form progressions denoted by scale degrees. Popular chord progressions can include I-IV-V progression, II-V progression, II-VI progression, and IV-VII progression, and so forth. There are scores of scales including chromatic scale, whole tone scale, blues scale, pentatonic scale, jazz scale, altered scale, to name a few, and diatonic scales such as major scale, natural minor scale, harmonic minor scale, and melodic minor scale.

Diatonic scales are scales that include a combination of half steps (semitones) and whole steps. Different diatonic scales include the major scale, the natural minor scales, the harmonic minor scale, the melodic minor scale, to name a few. The first and last note of a diatonic scale is the tonic or root. The second note is the supertonic. The third is the mediant, halfway between the tonic and dominant. The fourth note is the subdominant. The fifth note is the dominant. The submediant is the sixth note. The subtonic is the seventh note in the natural minor scale. The seventh tone of the major, harmonic and melodic minor scales is called the leading tone.

There are many different types of harmonicas used by harmonica players including standard and specially-tuned diatonic harmonicas, chromatic harmonicas, tremolo harmonicas, and octave harmonicas. The most widely known type of harmonica is the standard-tuned ten-hole diatonic, in which twenty reeds produce nineteen natural tones, with one tone being duplicated. The ten-hole diatonic harmonica typically has ten blow reeds, which sound in response to air blown into the diatonic harmonica and ten draw reeds, which sound in response to air drawn in through the diatonic harmonica. The nineteen tones allow the player to play all the diatonic tones of a middle octave and most of the tones of a lower and a higher octave. A moderately advanced harmonica player can produce twelve additional tones by a process known as "bending," whereby the player modifies the resonant volume in the vocal passage, principally with the tongue, to "bend" or adjust the tone produced to achieve the desired pitch.

A more advanced player can also produce four additional tones by a technique known as "overblowing," whereby the player more strictly matches the appropriate resonant volume with the tone one wishes to produce. Similarly, drawing and a strictly controlled shaping of the resonant passage will produce "overdraw" tones from the blow reeds corresponding to a sharped first, fifth and eighth of the highest octave. Overblow and overdraw tones can be produced from all holes of the diatonic harmonica, but except for those listed, tones can be produced more easily with other techniques. In all, the most skilled harmonica player can produce a total of thirty-eight tones of the chromatic scale from the ten-hole diatonic harmonica, using the normal playing, bending, overblowing, and overdrawing playing techniques.

Diatonic harmonicas come in twelve different keys, one for each half-step in a western twelve semitone chromatic octave. When a diatonic harmonica is played in the key that it is labeled, it is said to be played in first position. Songs played in first position often use predominantly blow notes. Playing first position can usually have an associated folk-type sound. To play "cross harp" (second position) the song key is five half-steps down from the key of the diatonic harmonica. To play a C diatonic harmonica in cross, or second position, for example, the harmonica would be played in the major song key of G. Songs played in second position often use predominantly draw notes. Playing second position can usually have an associated blues-type sound. The G note in the major song key of G can also be referred to as the root note or tonic note. There are twelve "positions" that a diatonic harmonica can be played in, so it is possible to play in all keys on one diatonic harmonica, but it is difficult. Each diatonic harmonica position can sometimes be associated with a specific genre-type of sound, style of playing, and playing technique. Most harmonica players typically only learn first, second, and maybe third positions. More advanced players may also learn to play in fourth, fifth, sixth, or twelfth positions. Generally, only those highly skilled in the art of overblowing and overdrawing will ever become proficient in any of the remaining positions (7th thru 11th).

Quite often a harmonica player needs to make quick judgment calls as to which diatonic harmonica key to select and which diatonic harmonica position to play in when a song is spontaneously called out to be played next in a live music jam, practice or performance scenario. There can be multiple selection choices depending on the key of a song and what genre-type sound or role the diatonic harmonica player is looking to contribute to the song.

Also, it is generally difficult for a harmonica player to locate a specific note on a harmonica of a specific key. The tuning of the diatonic harmonica was originally designed to facilitate the production of major chords by means of blowing on multiple tone holes simultaneously. Due in part to this tuning arrangement and the special techniques required to obtain notes unavailable through ordinary blowing and drawing, the location of specific single notes on a given harmonica and the means for obtaining these specific single notes are not nearly as intuitive as in the case of say a piano or guitar. Further complicating the task of locating notes on a harmonica is the fact that harmonicas are available in one of twelve different keys, and specific note locations will differ for each.

Figure 1:
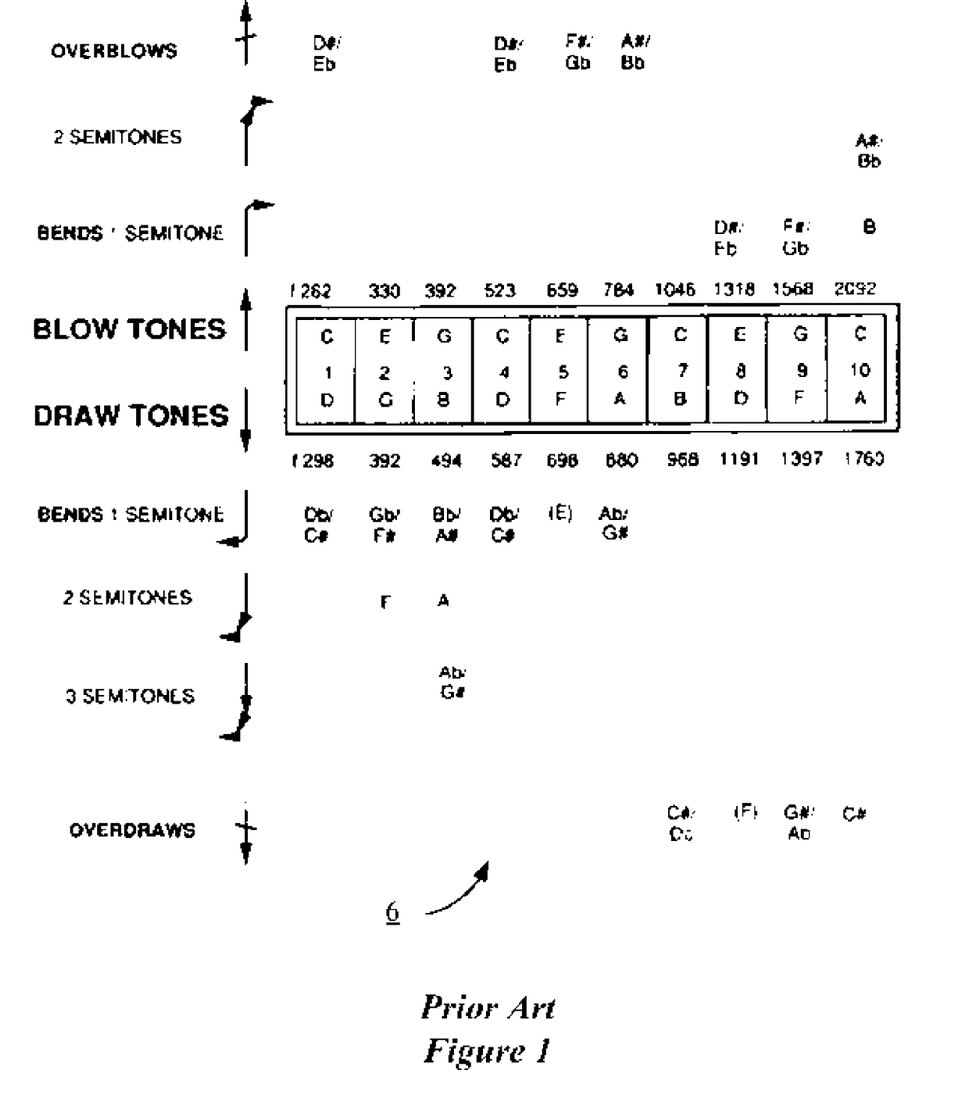
FIG. 1 illustrates prior art of a harmonica chart (key of C) for associating note locations with location of tone holes and playing technique to apply for producing the desired note.

A harmonica map or chart is known in the art (see FIG. 1, also found in U.S. Pat. No. 5,739,446) to assist in using note locations to find location of tone holes and playing techniques that may apply for producing the desired note. The drawback to using such a map or chart to learn about or play a harmonica is that twelve separate charts, each chart for a harmonica of a different key, would be needed.

Therefore a need exists to very quickly assist the user in making harmonica position choices and in locating any note on a harmonica of any key and in learning about these relationships without the use of a multitude of charts or other cumbersome electronic display devices that may include computer software.

Prior art discloses different ways of making and using a music wheel as a learning aid.

U.S. Pat. No. 4,716,806 to Forrest describes a musical indicating apparatus which has rotating members carrying the notes of a chromatic musical scale for use in finding chords, scales in general and transposing.

U.S. Pat. No. 4,305,323 to Graham describes a harmonic conversion wheel for the purposes of teaching or transposing music.

U.S. Pat. No. 4,069,736 to Amemiya describes forming a circular display of musical notes in the use of the circle of fifths for learning music.

U.S. Pat. No. 3,472,117 to Iverson, Jr. describes a music wheel system for suggesting notes to play between two keys.

U.S. Pat. No. 1,804,460 to Cordier describes a music wheel system for finding chords.

Prior art also discloses different ways of musically assisting a harmonica player.

U.S. Pat. No. 6,870,085 to MacCutcheon describes a method for matching coded note symbols of musical compositions to coded note location and formation identifiers of instruments including a diatonic harmonica.

U.S. Pat. No. 5,309,812 to Shelton describes a method and device to aid in learning to play chords on a diatonic harmonica.

However no prior art describes using a music wheel, slide rule, or other moveable arrangement between at least two surfaces specifically adapted for musical needs of a harmonica player. Therefore a need exists for a system to assist a harmonic player with making musical choices based upon presenting harmonica key, song key, harmonica position, note location, and playing technique information in a compact easy-to-use manner.

SUMMARY OF THE INVENTION

The present invention can assist a musician or harmonica player with selecting which diatonic harmonica (harmonica key) to use when a song key and diatonic harmonica playing position is known. The present invention can assist a musician or harmonica player with selecting which song key to be played on accompanying instruments when the harmonica key and harmonica playing position is known. The present invention can assist a musician or harmonica player with selecting which harmonica position to use when a song key and harmonica key is known. The present invention can assist a musician or harmonica player with locating a specific note on a specific harmonica when the harmonica key is known. The present invention can assist a musician or harmonica player with determining the specific note obtained from a note location on a specific harmonica when the harmonica key is known. The present invention can assist a musician or harmonica player to locate on a harmonica a tonic or root note in one or more octaves when which harp position to play is known.

In general, in accordance with the present invention, a first planar surface and a second planar surface divided into a plurality of adjacent sectors, the second planar surface attached concentrically and rotatable with respect to the first planar surface, the second planar surface including at least one display window to reveal at least one portion of the first planar surface bearing harmonica note location indicia and/or harmonica position indicia corresponding to use of a harmonica, the at least one display window to reveal the harmonica note location indicia and/or the harmonica position indicia upon a substantial alignment of a sector of the first planar surface with a sector of the second planar surface.

In accordance with an aspect of the present invention, a display device includes a first planar surface and a second planar surface divided into a plurality of adjacent sectors, each sector bearing indicia of a different musical note or key in a musical scale, the second planar surface smaller in diameter than the first planar surface attached concentrically and rotatable with respect to the first planar surface, the second planar surface including a display window to reveal a portion of the first planar surface bearing harmonica note location indicia and/or harmonica position indicia corresponding to use of a harmonica, said display window to reveal the harmonica note location indicia and/or the harmonica position indicia upon a substantial alignment of a sector of the first planar surface with a sector of the second planar surface.

In accordance with another aspect of the present invention, a display device includes a first planar surface such as a first disk divided into adjacent sectors, each sector including indicia of a different musical note in a musical scale, each musical note of the first disk indicative of a different harmonica key and a second planar surface such as a second disk smaller in diameter than the first disk attached concentrically and rotatable with respect to the first disk, the second disk divided into adjacent sectors, each sector including indicia of a different musical note in the musical scale, each musical note of the second disk indicative of a different song key or song note, the second disk provided with a display window to reveal a selected portion of the first disk, the selected portion of the first disk displaying one of multiple harmonica note location indicia and/or harmonica position indicia corresponding to use of a harmonica, display window to reveal the harmonica note location indicia and/or the harmonica position indicia upon a substantial alignment of a selected harmonica key of the first disk and a selected song key of the second disk.

In accordance with yet another aspect of the present invention, a display device includes a first planar surface such as a first disk divided into a plurality of adjacent sectors, each sector including indicia of a different musical note in a musical scale, each musical note of said first disk indicative of a different harmonica key and second planar surface such as a second disk smaller in diameter than the first disk attached concentrically and rotatable with respect to the first disk, the second disk divided into a plurality of adjacent sectors, each sector including indicia of a different harmonica note location indicia and/or harmonica position indicia corresponding to use of a harmonica, the second disk provided with a display window to reveal a selected portion of the first disk, the selected portion of the first disk displaying one of a plurality of song notes or keys with respect to alignment of a selected harmonica key of the first disk and a selected harmonica note location indicia and/or harmonica position indicia corresponding to a harmonica of the second disk.

In accordance with yet another aspect of the present invention, a display device including a first planar surface such as a first disk divided into a plurality of adjacent sectors, each sector including indicia of a different musical note in a musical scale, each musical note of the first disk indicative of a different song note or key and second planar surface such as a second disk smaller in diameter than the first disk attached concentrically and rotatable with respect to the first disk, the second disk divided into a plurality of adjacent sectors, each sector including indicia of a different harmonica note location indicia and/or harmonica position indicia corresponding to a harmonica, the second disk provided with a display window to reveal a selected portion of the first disk, the selected portion of the first disk displaying one of a plurality of harmonica keys with respect to alignment of a selected song note or key of the first disk and a selected harmonica note location indicia and/or harmonica position indicia corresponding to a harmonica of the second disk.

In accordance with yet another aspect of the present invention, a display device includes a first planar surface such as a first disk divided into a plurality of adjacent sectors, each sector including different harmonica note location indicia and/or harmonica position indicia corresponding to a harmonica and second planar surface such as a second disk smaller in diameter than the first disk attached concentrically and rotatable with respect to the first disk, the second disk divided into a plurality of adjacent sectors, each sector including indicia of a different musical note in a musical scale, each musical note of the second disk indicative of a different harmonica key, the second disk provided with a display window to reveal a selected portion of the first disk, the selected portion of the first disk displaying one of a plurality of song notes or keys with respect to alignment of a selected harmonica note location indicia and/or harmonica position indicia corresponding to a harmonica of the first disk and a selected harmonica key of the second disk.

In accordance with yet another aspect of the present invention, a display device includes a first planar surface such as a first disk divided into a plurality of adjacent sectors, each sector including indicia of a different harmonica note location indicia and/or harmonica position indicia corresponding to a harmonica and a second planar surface such as a second disk smaller in diameter than the first disk attached concentrically and rotatable with respect to the first disk, the second disk divided into a plurality of adjacent sectors, each sector including indicia of a different musical note in a musical scale, each musical note of the second disk indicative of a different song note or key, the second disk provided with a display window to reveal a selected portion of the first disk, the selected portion of the first disk displaying one of a plurality of harmonica keys with respect to alignment of a selected harmonica note location indicia and/or harmonica position indicia corresponding to a harmonica of the first disk and a selected song note or key of the second disk.

In accordance with yet another aspect of the present invention, a method for performing at least one procedure with a display device including a first planar surface such as a first disk and a second planar surface such as a second disk divided into multiple adjacent sectors, each sector bearing indicia of a different musical note or key in a musical scale, the second disk smaller in diameter than the first disk attached concentrically and rotatable with respect to the first disk, the second disk including at least one display window to reveal a portion of the first disk bearing harmonica note location indicia and/or harmonica position indicia when a sector of the first disk and a sector of the second disk are substantially aligned, the method including selecting the at least one procedure from a group of procedures including one of a first procedure including substantially aligning the at least one display window to display a chosen harmonica position indicia and determining a harmonica key from indicia of the sector of the first planar surface that is substantially aligned with the sector of the second planar surface bearing indicia of a desired song key, a second procedure including substantially aligning the at least one display window to display a chosen harmonica position indicia and determining a song key from indicia of the sector of the second planar surface that is substantially aligned with the sector of the first planar surface bearing indicia of a desired harmonica key, a third procedure including substantially aligning the sector of the first planar surface representing a chosen harmonica key in relation to the sector of the second planar surface representing a chosen song key and determining the required harmonica position by indicia revealed in the at least one display window, a fourth procedure including substantially aligning the sector of the first planar surface representing a chosen harmonica key in relation to the sector of the second planar surface representing a desired song note and determining all note locations of the desired song note on a chosen harmonica by indicia revealed in the at least one display window, a fifth procedure including substantially aligning the at least one display window to display a chosen note location and determining what note will be obtained at the note location from a chosen harmonica of a specific key by noting a song note represented by indicia of whichever sector of the second planar surface is substantially aligned with the sector of the first planar surface bearing indicia of the specific harmonica key, and a sixth procedure including substantially aligning the at least one display window to display a chosen harmonica position indicia and determining at least one note location corresponding to the harmonica position indicia and performing the at least one selected procedure with the display device.

In accordance with yet another aspect of the present invention, a method for using a display device includes a first planar surface and a second planar surface of substantially similar size divided into a plurality of adjacent sectors, the second planar surface attached concentrically and rotatable with respect to the first planar surface, the second planar surface including a first display window to reveal a first portion of the first planar surface harmonica position indicia and additional windows to reveal one or more portions of the first planar surface bearing harmonica note location indicia corresponding to use of a harmonica, the first display window to reveal the harmonica position indicia and additional display windows to reveal the harmonica location indicia upon a substantial alignment of a sector of the first planar surface with a sector of the second planar surface, the method including substantially aligning the first display window to display a chosen harmonica position indicia and determining at least one note location corresponding to the harmonica position indicia displayed in the one or more windows.

In accordance with yet another aspect of the present invention, a method where a first planar surface such as a first disk and a second planar surface such as a second disk are divided into multiple adjacent sectors, each sector bearing indicia of a different musical note or key in a musical scale, the second disk smaller in diameter than the first disk attached concentrically and rotatable with respect to the first disk, the second disk including a display window to reveal a portion of the first disk bearing harmonica position indicia, the method includes substantially aligning the window to display a chosen harmonica position indicia and determining a harmonica key from indicia of a sector of the first disk substantially aligned with a sector of the second disk bearing indicia of a desired song key or note.

In accordance with yet another aspect of the present invention, a substantially similar method including substantially aligning the window to display a chosen harmonica position indicia corresponding to a harmonica and determining a song key from indicia of a sector of the second disk that is substantially aligned with a sector of the first disk bearing indicia of a desired harmonica key.

In accordance with yet another aspect of the present invention, a substantially similar method including substantially aligning a sector of the first disk representing a chosen harmonica key in relation to a sector of the second disk representing a chosen song key and determining a harmonica position indicia corresponding to a harmonica revealed in the window.

In accordance with yet another aspect of the present invention, a substantially similar method including substantially aligning a sector of the first disk representing a chosen harmonica key in relation to a sector of the second disk representing a desired song note and determining all note locations of the desired song note on a chosen harmonica by indicia revealed in the window.

In accordance with yet another aspect of the present invention, a substantially similar method including substantially aligning the window to display a chosen note location indicia and determining what note will be obtained at the note location from a specific harmonica of a specific key by noting a song note represented by indicia of whichever sector of the second disk is substantially aligned with a sector of the first disk bearing indicia of the specific harmonica key.

In accordance with yet another aspect of the present invention, a substantially similar method including substantially aligning the window to display a chosen harmonica position indicia corresponding to a harmonica and determining at least one note location corresponding to the window displaying the chosen harmonica position indicia.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

DETAILED DESCRIPTION OF THE INVENTION

The present invention will now be described with reference to the drawings, wherein like reference numerals are used to refer to like elements throughout.

Illustrated in FIG. 1 is prior art of a harmonica chart 6 in the key of C for associating note locations with location of tone holes and playing technique to apply for producing the desired note. The drawback to using such a map or chart 6 to learn about or play a harmonica is that twelve separate charts, each chart of a key for each different harmonica, would be needed to achieve results similar to that of the present invention which eliminates such need by presenting information with a single portable music display device.

The reference numeral 10 designates a music display device (see FIG. 2) of the present invention generally. In its preferred embodiment, it consists of a first planar surface 11 in the shape of a circular disk shaped member, a second planar surface 21 as a faceplate member in the shape of a circular disk as well, and attaching means 22 for allowing the second disk 21 to move in a rotational manner about the attaching means 22 with respect to the first disk 11. It will be appreciated that boundary of first and second planar surfaces can be made in many shapes including polygons, circles, random, fractal, and any pattern.

It can further be appreciated by one of ordinary skill in the art that such music display device 10 can be constructed with at least two substantially planar surfaces that are in planar positional communication with each other. For instance, in an alternate embodiment a first planar surface can be a display panel that allows a second planar surface to be engaged to slide in relation with the display panel similar to the operation of a slide rule. A more complete description of the function and interaction of these elements will be found in the below given detailed specification.

Figure 2:
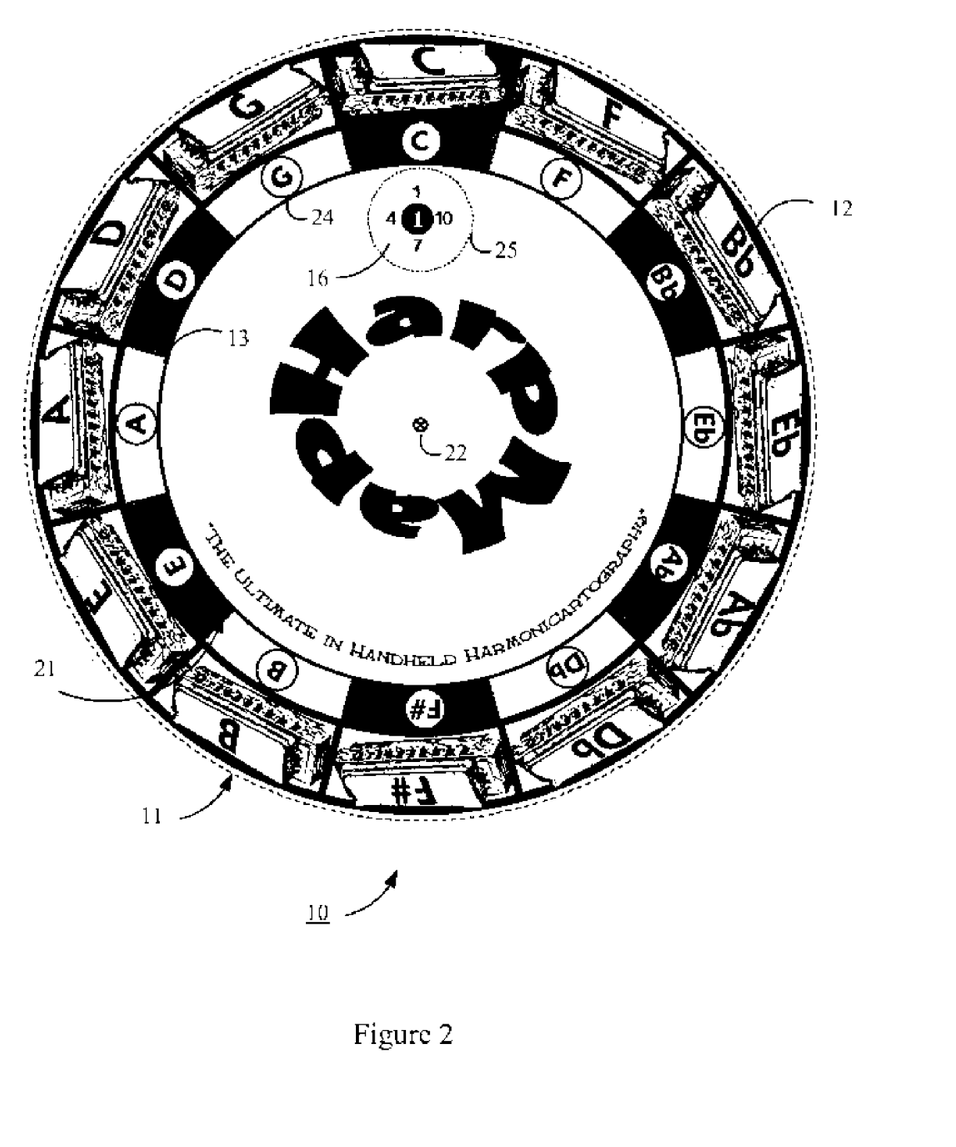
FIG. 2 illustrates a first disk attached to a smaller second disk including song key indicia and a view window to display the answer set of the first disk in accordance with the present invention.

FIG. 2 is a plan view showing the elements of the music display device 10 in detail. The present invention can be made from a suitable stiff material of construction such as pressboard, poster board, celluloid, cardboard, laminated paper, laminated plastic, plastic or like material. These materials have sufficient durability and reliability to withstand ordinary abuse and neglect of musicians. They are also in ready supply and easily worked with. Because these materials are lightweight as well, the instant device 10 is portable and will thus achieve widespread acceptance and use within the field of music that can be attributed to all of its features. Preliminary prototypes of this invention have been fabricated from simple cardboard which has proven to be extremely reliable, lightweight and durable. In this form, the present invention can be easily fabricated, inexpensively manufactured and readily mass produced in sufficient quantities to make it an economic success within the industry. Further, the utilization of special manufacturing processes and highly skilled labor is unnecessary to make and assemble such a device.

Music display device 10 is constructed by joining the first disk 11 to the second disk 21 by attaching means 22 such as rivet or fastener. The second disk 21 moves relative to the first disk 11 by means of rotation. Each of the disks can be coaxially mounted through the provision of a connector 22 passing through an appropriate centrally disposed aperture. Respective dimensioning of the disks such that their peripheries correspond with one another and the indicia thereon is readable.

The first disk 11 or outer disk includes indicia indicative of a diatonic harmonica key 12 whereas the second disk 21 or inner disk includes indicia indicative of song key and/or song note 24. The inner disk further includes a display window 25 for displaying a unit of resultant location and position indicia 16 of a given sector 13 which is part of a complete set 26 (see FIG. 3) of resultant location and position indicia 16 spanning all sectors 13. Each disk includes twelve sectors 13, marked by lines surrounding note/key indicia including the notes of the chromatic musical scale; that is, A through G with the various flats and sharps. Indicia of adjacent sectors 13 are arranged clockwise as the circle of fifths.

Figure 3:
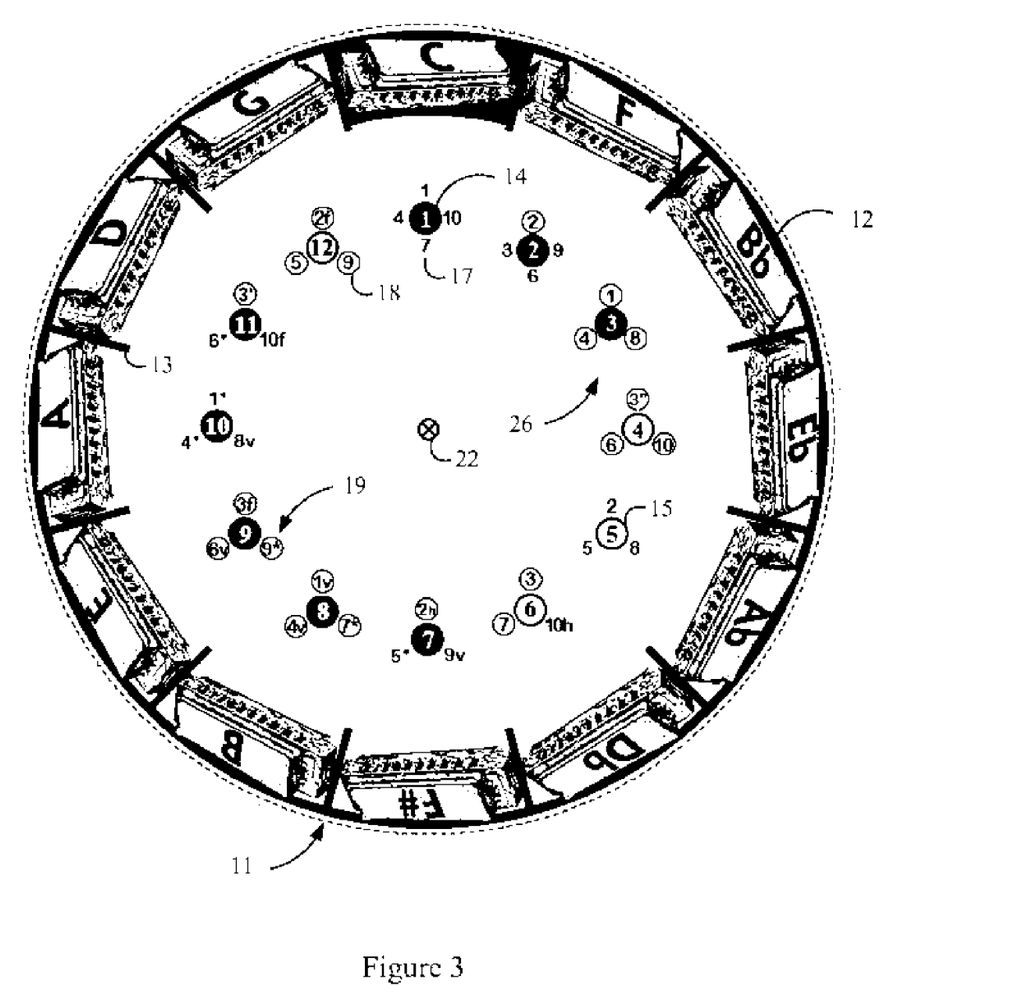
FIG. 3 illustrates front surface of a first disk including harmonica key indicia and harmonica position and note location indicia in accordance with the present invention.

Illustrated in FIG. 3 is front surface of the first disk 11 including harmonica key indicia 12 and the complete set of corresponding resultant location and position indicia 26 for all twelve semitones of an octave. Each sector 13 of resultant location and position indicia 16 further includes harmonica playing position information 14 which is marked with a visual indicator such as a type of color or degree of shading 15 relative to frequency of such diatonic harmonica position 14 which may generally be used by a harmonica player. For instance, more shading or darker color may visually indicate a greater frequency of use whereas less shading or lighter color may visually indicate a lesser frequency of use. Each sector 13 or unit of resultant location and position indicia 16 also includes note location indicia 19 corresponding to and in proximity to harmonica playing position information 14, the note location indicia denoting numerals note locations (to determine which harmonica tone hole or holes to play) 17, and in some cases, additional modifier symbols 18 (e.g., notation for draw, various type of bends, overblow, overdraw, etc.) indicative of a which playing technique to apply for producing the tonic or root note of a song key corresponding to the harmonica playing position 14.

Though a preferred embodiment illustrates the outer first disk 11 as harmonica key 12, the inner second disk 21 as song key or song note 24, and display window 25 revealing a unit of resultant location and position indicia 26 including playing position 14 and note locations 17, one of ordinary skill of art can appreciate the many alternate embodiments of how the music display device 10 can be constructed including but not limited to having either inner disk, outer disk, or display window bear indicia of either song key, harmonica key, playing position, and note locations, in any combination. Such combinations are also discussed in summary of invention.

For example, note locations 17 surrounding a harmonica playing position 14 can instead be aligned radially with respect to a sector 13 so that the note locations 17 are positioned adjacent to the harmonica playing position 14 from above, below, right or left side. (e.g., resultant set 16 of all harmonica position indicia is marked on the first disk 11 in a circumference of a first radius whereas the resultant set 16 of all note location indicia is marked on the first disk 11 in a circumference of a second radius. By so doing, another one or more display windows can be made to show note locations in a separate window from harmonica playing position 14. Only one window is needed to reveal a single harmonica position 14, however additional windows can be made to simultaneously show note locations across all scale degrees with respect to the revealed harmonica position.

Figure 4:
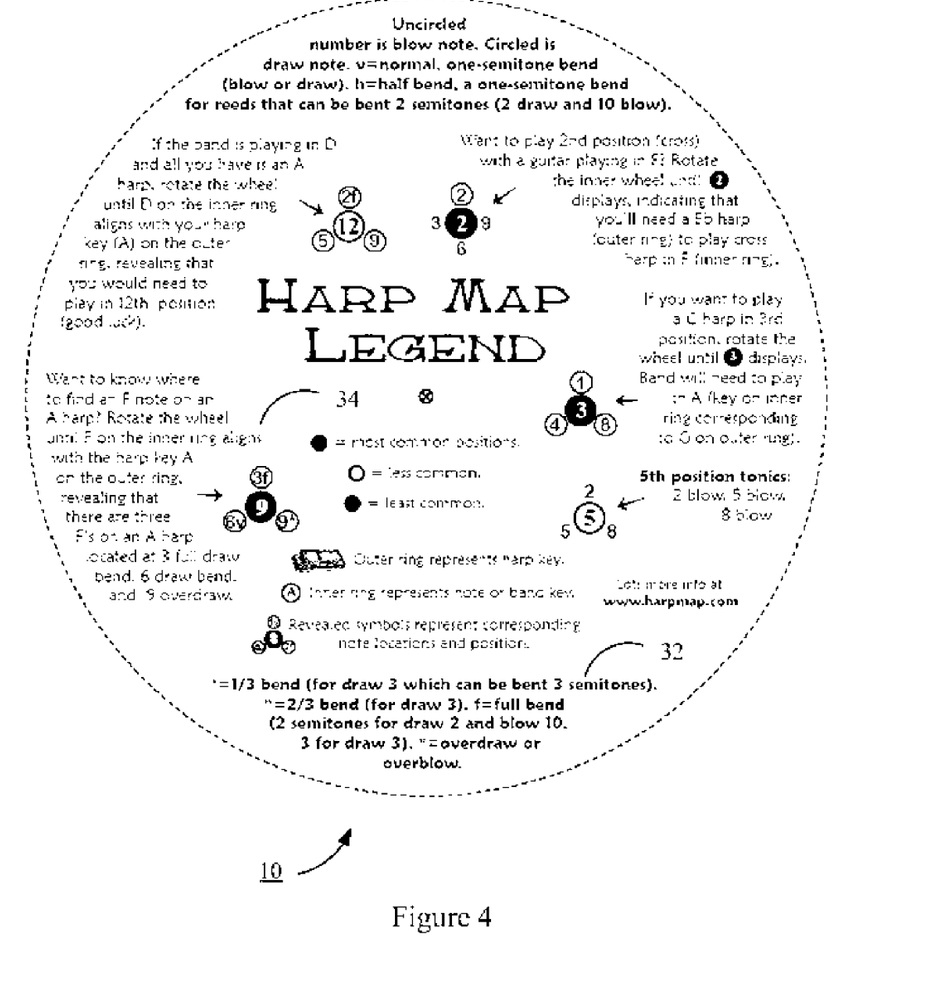
FIG. 4 illustrates a legend and instructions marked upon rear surface of the first disk in accordance with the present invention.

Illustrated in FIG. 4 is rear surface of the first disk 11 including legend information 32 and instructions for achieving different desired display results 34 in accordance with the present invention. Legend information denotes where possible common harmonica notation to identify playing position, playing technique, and note location. However, advancements have been made to more effectively compress such information and take less space to visually encode the information in the form of a unit of resultant location and position indicia 16 that helps a harmonica player determine playing position, playing technique, and note location, location of a tone hole, etc. Further such note location indicia can use symbolic notation that is more intuitively visually associated to specific playing techniques (e.g., ' for one-third bend note, " for two-thirds bend note, etc.).

Several instructions 34 are marked upon rear surface of the first disk 11, which teach a musician using the music display device 10 several scenarios or methods and musical situations of how and when the display device 10 can be used including methods discussed in summary of invention.

Illustrated in FIGS. 5*a*-5*f* are a variety of procedures that can be selected, in any combination, and performed with the music display device 10.

Figure 5A:
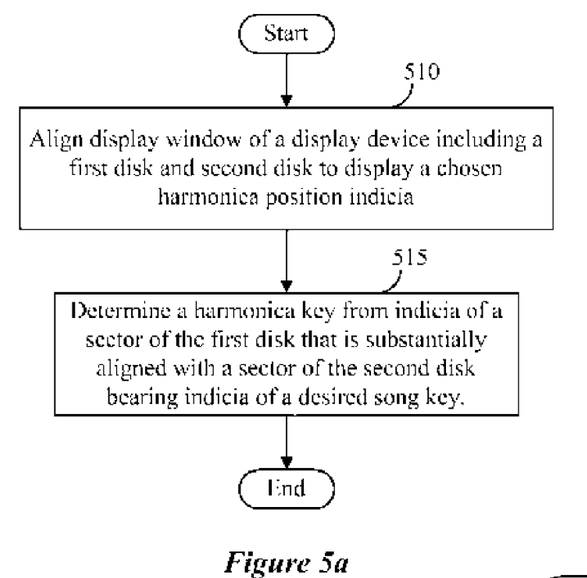
FIG. 5a illustrates a top level flowchart for performing a first procedure with a display device in accordance with the present invention.

In FIG. 5*a*, a display window of a display device having a first disk and second disk can be aligned in step 510 to display a chosen harmonica position indicia then a harmonica key can be determined in step 515 from indicia of a sector of the first disk that is substantially aligned with a sector of the second disk bearing indicia of a desired song key.

Figure 5B:
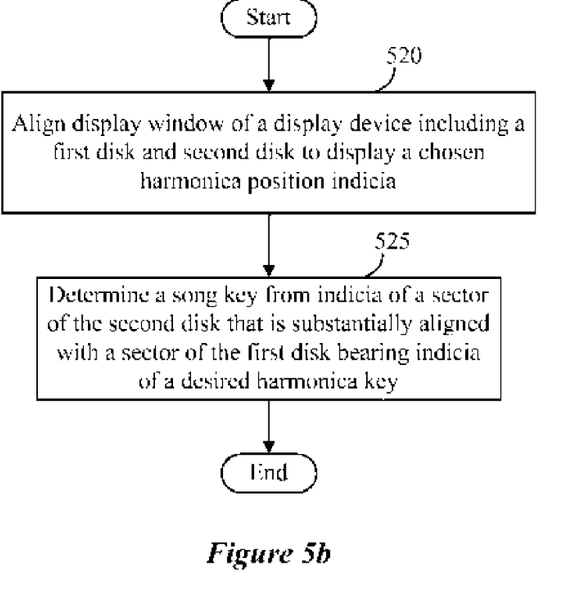
FIG. 5b illustrates a top level flowchart for performing a second procedure with a display device in accordance with the present invention.

In FIG. 5*b*, a display window of a display device having a first disk and second disk can be aligned in step 520 to display a chosen harmonica position indicia then a song key can be determined in step 525 from indicia of a sector of the second disk that is substantially aligned with a sector of the first disk bearing indicia of a desired harmonica key.

Figure 5C:
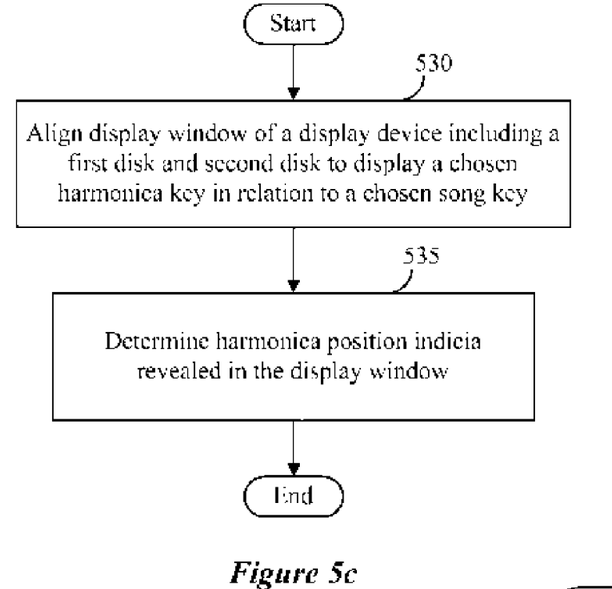
FIG. 5c illustrates a top level flowchart for performing a third procedure with a display device in accordance with the present invention.

In FIG. 5*c*, a display window of a display device including a first disk and second disk can be aligned in step 530 to display a chosen harmonica key in relation to a chosen song key then harmonica position indicia revealed in the display window can be determined in step 535.

Figure 5D:
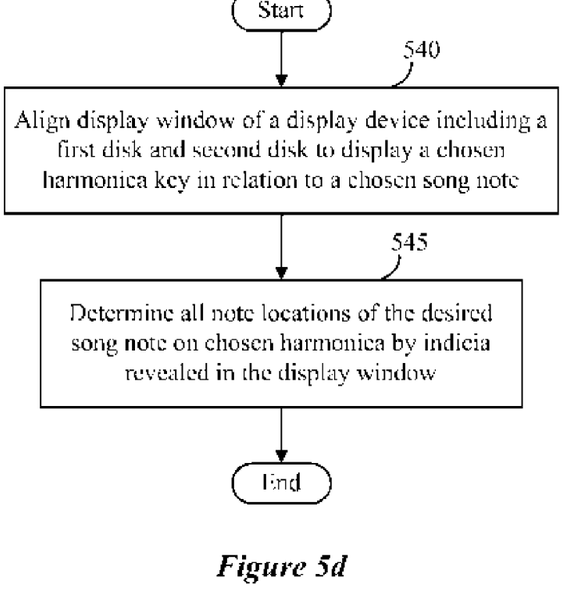
FIG. 5d illustrates a top level flowchart for performing a fourth procedure with a display device in accordance with the present invention.

In FIG. 5*d*, a display window of a display device including a first disk and second disk can be aligned in step 540 to display a chosen harmonica key in relation to a chosen song note then all note locations of the desired song note on a chosen harmonica by indicia revealed in the display window can be determined in step 545.

Figure 5E:
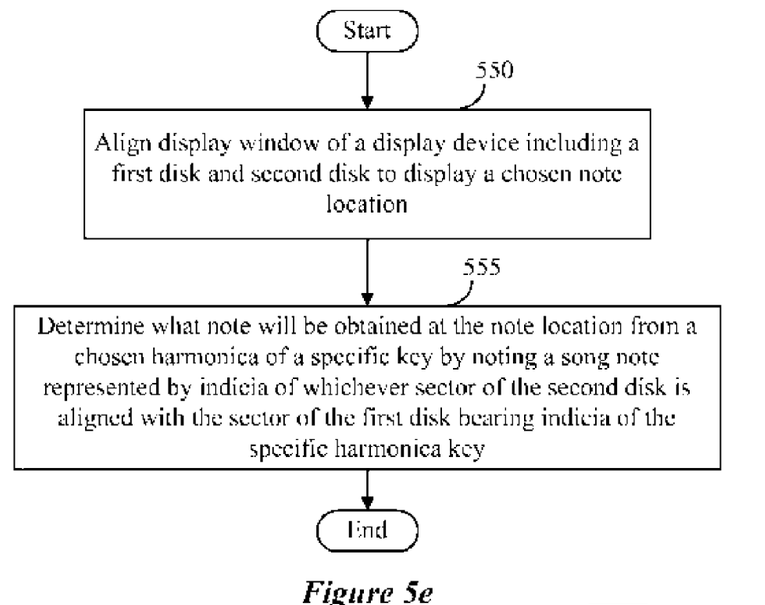
FIG. 5e illustrates a top level flowchart for performing a fifth procedure with a display device in accordance with the present invention.

In FIG. 5*e*, a display window of a display device including a first disk and second disk can be aligned in step 550 to display a chosen note location then it can be determined in step 555 what note will be obtained at the note location from a chosen harmonica of a specific key by noting a song note represented by indicia of whichever sector of the second disk is aligned with the sector of the first disk bearing indicia of the specific harmonica key.

Figure 5F:
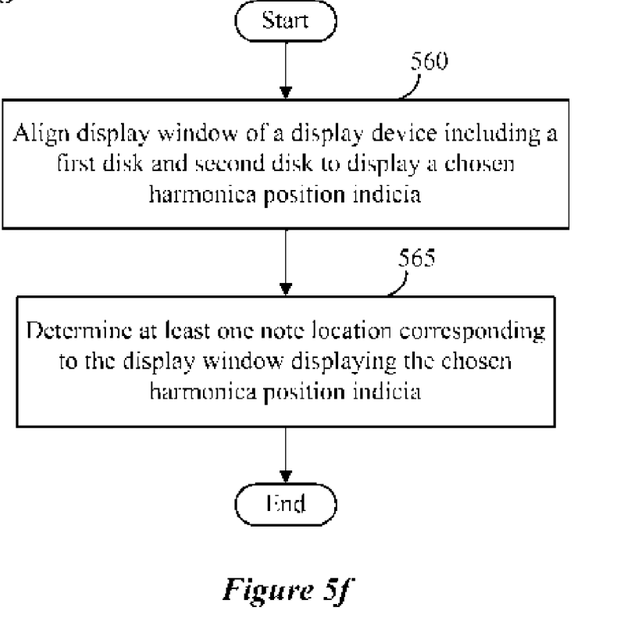
FIG. 5f illustrates a top level flowchart for performing a sixth procedure with a display device in accordance with the present invention.

In FIG. 5*f*, a display window of a display device including a first disk and second disk can be aligned in step 560 to display a chosen harmonica position indicia then at least one note location corresponding to the display window displaying the chosen harmonica position indicia can be determined in step 565.

Figure 6:
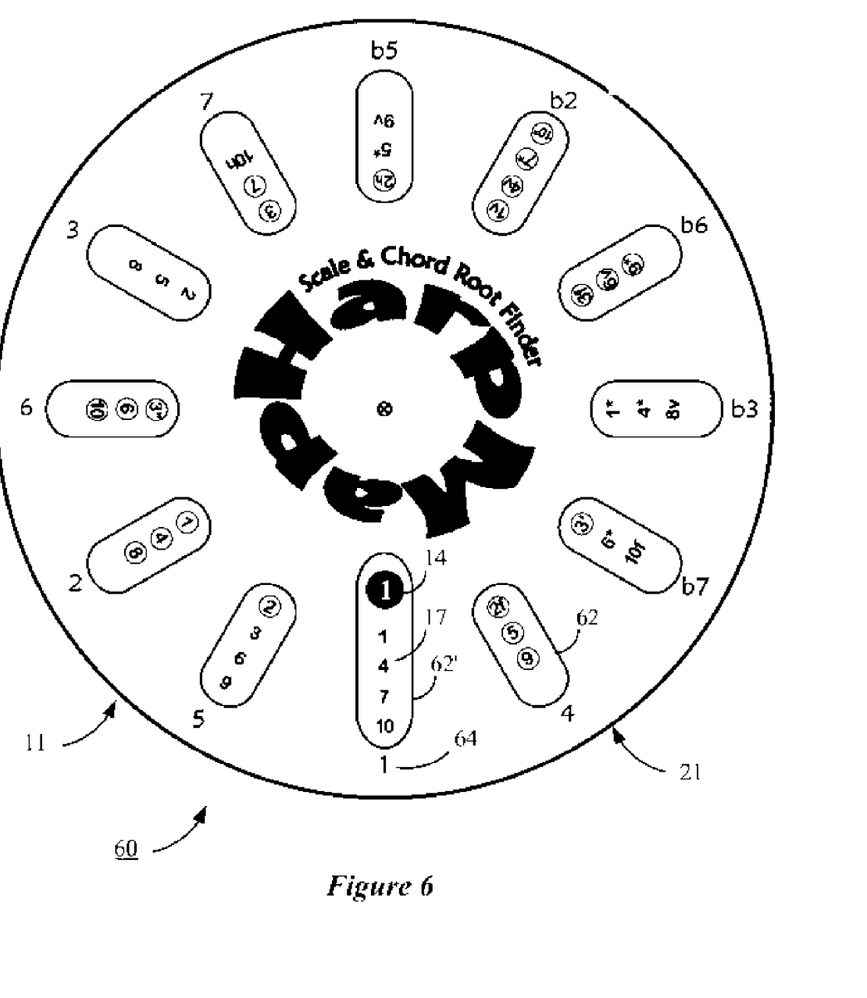
FIG. 6 illustrates a first disk attached to a second disk of similar size that includes multiple view windows to for displaying the relationship between harmonica position and scale degree in accordance with the present invention.

Illustrated in FIG. 6 is a top view of a display device 60 which includes a first disk 11 having resultant note location 17 and position indicia 14 covered by an attached and rotatable second disk 21 having multiple windows 62 used to reveal the resultant note location 17 and a specific window 62' to include both note location indicia 17 and harmonica position indicia 14. Scale degree indicia 64 corresponding to and marked on the second disk 21 near each window 62. One window 62' is distinct from all other windows 62 that when aligned will additionally show a selected or resultant harmonica playing position in relationship to the tonic or first degree of the scale. Additionally, each other display window 62 will show note locations 17 relating to corresponding scale degree indicia 64 for that playing position. Because this aspect of the present invention does not rely upon indicia (e.g., note/key) near the perimeter of both disks, there is no need for one disk to be smaller than the other.

With regard to other aspects of the present invention, each musical note or key of the first planar surface of the music display device is indicative of a different harmonica key and each the musical note or key of the second planar surface is indicative of a different song key and/or song note. Each musical note or key of the first planar surface is indicative of a different song key and/or song note and each musical note or key of the second planar surface is indicative of a different harmonica key. Each musical note or key is marked substantially near a perimeter of the first planar surface and substantially near a perimeter of the second planar surface.

Furthermore, surface area of each sector can be maximized to include as much compressed musical notation and indicia to allow any combination of scales, modes, chord progressions, note locations, playing positions, and the like to be displayed to gain as much musical learning and decision making information as possible when one or more display windows expose such notation from substantial alignment of at least the two moveable planar surfaces.

Harmonica note location indicia denotes which hole of a harmonica to play and which technique to apply, if any, upon the hole in order to generate one or more tones representative of one of a note, key, chord, chord progression, scale, scale degree, and scale mode corresponding to the harmonica note locations. A music interval of each adjacent sector of the first planar surface and a music interval of each adjacent sector of the second planar surface are arranged at least one semitone apart.

Alignment of the sector of the first planar surface with the sector of the second planar surface can assist one or more musicians in making a musical decision and/or assist the one or more musicians in learning or communicating with regard to a musical relationship between at least two of a song note, song key, harmonica key, harmonica note location, and harmonica position. Alignment of the sector of the first planar surface with the sector of the second planar surface can assist the one or more musicians transcribe a melody, while studying, during a music performance, between a plurality of music performances, during a music practice, and while the one or more musicians are communicating verbally, visually, and/or musically.

At least one display window is a first display window to reveal the harmonica position indicia of a single harmonica position and a second window to reveal the harmonica note location indicia of at least one note location corresponding to the single harmonica position, each note location of a tonic in a different octave. One or more display windows can reveal the harmonica note location indicia of at least one note location corresponding to the single harmonica position, where each display window includes the note location selected from a group consisting of a supertonic, mediant, subdominant, dominant, submediant, subtonic, and leading tone in a different octave.

The present invention is by no means limited to disks or surfaces of different size lengths or diameters nor is there a requirement of marking surfaces with harmonica key, song notes, and song keys as indicia on the surface perimeter either. For instance, it is sufficient enough to display results useful to a musician by showing the direct relationship between a desired harmonica playing position and note locations of each degree of a music scale. When surfaces are rotated to display a chosen harmonica position indicia at least one note location corresponding to the harmonica position indicia is displayed in one or more other windows.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. A display device comprising:
a first planar surface and a second planar surface divided into a plurality of adjacent sectors, said second planar surface attached concentrically and rotatable with respect to said first planar surface, said second planar surface including at least one display window to reveal at least one portion of said first planar surface bearing at least one of a harmonica note location indicia and harmonica position indicia corresponding to use of a harmonica, said at least one display window to reveal said at least one of said harmonica note location indicia and said harmonica position indicia upon a substantial alignment of a sector of said first planar surface with a sector of said second planar surface, wherein said harmonica position indicia is indicative of a plurality of harmonica playing positions.

2. A display device, as set forth in claim 1, wherein said second planar surface is smaller in diameter than said first planar surface, each said sector of said first planar surface and each said sector of said second planar surface bearing indicia of a different musical note or key in a musical scale.

3. A display device, as set forth in claim 2, wherein each said musical note or key of said first planar surface is indicative of a different harmonica key and each said musical note or key of said second planar surface is indicative of a different at least one of a song key and song note.

4. A display device, as set forth in claim 2, wherein each said musical note or key of said first planar surface is indicative of a different said at least one of a song key and song note and each said musical note or key of said second planar surface is indicative of a different harmonica key.

5. A display device, as set forth in claim 2, wherein each said musical note or key is marked substantially near a perimeter of said first planar surface and substantially near a perimeter of said second planar surface.

6. A display device, as set forth in claim 2, wherein each said harmonica position indicia is uniquely marked with a numeral ranging from one to twelve having one of a plurality of visual indicators, each said visual indicator representative of a relative ease and frequency with which said harmonica playing position is played.

7. A display device, as set forth in claim 2, wherein said harmonica note location indicia denotes a plurality of harmonica note locations corresponding to each said harmonica playing position, said harmonica note location indicia corresponding to and placed in proximity to said harmonica playing position indicia so as to be simultaneously viewable with said harmonica playing position indicia through said at least one display window.

8. A display device, as set forth in claim 7, wherein said harmonica note location indicia denotes which hole of a harmonica to play and which technique to apply upon said hole in order to generate one or more tones representative of one of a note, key, chord, chord progression, scale, scale degree, and scale mode corresponding to said harmonica note locations.

9. A display device, as set forth in claim 8, wherein said harmonica note location indicia includes a numeral representative of a number of holes away from one side of said harmonica in order to determine which said hole of said harmonica to play.

10. A display device, as set forth in claim 9, wherein a modifier symbol adjacent to said numeral denotes said harmonica note location indicia indicative of said technique to play one of a bend-type note, overdraw note, and overblow note.

11. A display device, as set forth in claim 10, wherein said bend-type note is selected from a group including one of a normal bend note, half-bend note, one-third bend note, two-thirds bend note, and full bend note.

12. A display device, as set forth in claim 10, wherein said modifier symbol is selected from a group including one of a v for normal bend note, h for half-bend note, f for full bend note, ' for one-third bend note, " for two-thirds bend note, and * for overdraw note or overblow note.

13. A display device, as set forth in claim 2, wherein a music interval of each said adjacent sector of said first planar surface and a music interval of each said adjacent sector of said second planar surface are arranged at least one semitone apart.

14. A display device, as set forth in claim 2, wherein said alignment of said sector of said first planar surface with said sector of said second planar surface can at least one of a assist one or more musicians in making a musical decision and assist said one or more musicians in learning or communicating with regard to a musical relationship between at least two of a song note, song key, harmonica key, harmonica note location, and harmonica position.

15. A display device, as set forth in claim 14, wherein said alignment of said sector of said first planar surface with said sector of said second planar surface can assist said one or more musicians transcribe a melody, while studying, during a music performance, between a plurality of music performances, during a music practice, and while said one or more musicians are communicating at least one of a verbally, visually, and musically.

16. A display device, as set forth in claim 15, wherein said musicians includes a first musician that can play said harmonica and a second musician that cannot play said harmonica.

17. A display device, as set forth in claim 1, wherein each said adjacent sector of said first planar surface is substantially a same size and each said adjacent sector of said second planar surface is substantially a same size.

18. A display device, as set forth in claim 1, wherein said harmonica includes at least ten holes and is one of a standard tuned diatonic harmonica, specially tuned diatonic harmonica, chromatic harmonica, tremolo harmonica, and octave harmonica.

19. A display device, as set forth in claim 1, wherein a boundary of said first planar surface and said second planar surface is in a shape of one of a polygon, circle, fractal, random, and pattern.

20. A display device, as set forth in claim 1, wherein said at least one display window is a first display window to reveal said harmonica position indicia of a single harmonica position and a second window to reveal said harmonica note location indicia of at least one note location corresponding to said single harmonica position, each said note location of a tonic in a different octave.

21. A display device, as set forth in claim 20, further including one or more display windows to reveal said harmonica note location indicia of at least one note location corresponding to said single harmonica position, each said display window including said note location selected from a group consisting of a supertonic, mediant, subdominant, dominant, submediant, subtonic, and leading tone in a different octave.

22. A method for performing at least one procedure with a display device including a first planar surface and a second planar surface divided into multiple adjacent sectors, each sector bearing indicia of a different musical note or key in a musical scale, the second planar surface smaller in diameter than the first planar surface attached concentrically and rotatable with respect to the first planar surface, the second planar surface including at least one display window to reveal a portion of the first planar surface bearing at least one of a harmonica note location indicia and harmonica position indicia when a sector of said first planar surface and a sector of said second planar surface are substantially aligned, the method comprising:

selecting said at least one procedure from a group of procedures including one of a first procedure including substantially aligning said at least one display window to display a chosen harmonica position indicia and determining a harmonica key from indicia of said sector of said first planar surface that is substantially aligned with said sector of said second planar surface bearing indicia of a desired song key, a second procedure including substantially aligning said at least one display window to display a chosen harmonica position indicia and determining a song key from indicia of said sector of said second planar surface that is substantially aligned with said sector of said first planar surface bearing indicia of a desired harmonica key, a third procedure including substantially aligning said sector of said first planar surface representing a chosen harmonica key in relation to said sector of said second planar surface representing a chosen song key and determining a harmonica position indicia revealed in said at least one display window, a fourth procedure including substantially aligning said sector of said first planar surface representing a chosen harmonica key in relation to said sector of said second planar surface representing a desired song note and determining all note locations of said desired song note on a chosen harmonica by indicia revealed in said at least one display window, a fifth procedure including substantially aligning said at least one display window to display a chosen note location and determining what note will be obtained at said note location from a specific harmonica key of a chosen harmonica by noting a song note represented by indicia of whichever sector of said second planar surface is substantially aligned with said sector of said first planar surface bearing indicia of said specific harmonica key, and a sixth procedure including substantially aligning said at least one display window to display a chosen harmonica position indicia and determining at least one note location corresponding to said harmonica position indicia; and, performing said at least one selected procedure with said display device.

23. A method for performing, at least one procedure using a display device including a first planar surface and a second planar surface of substantially similar size divided into a plurality of adjacent sectors, said second planar surface attached concentrically and rotatable with respect to said first planar surface, said second planar surface including a first display window to reveal a first portion of said first planar surface harmonica position indicia and one or more display windows to reveal one or more portions of the said planar surface bearing harmonica note location indicia corresponding to use of a harmonica, said first display window to reveal said harmonica position indicia and said one or more display windows to reveal said harmonica location indicia upon a substantial alignment of a sector of said first planar surface with a sector of said second planar surface, the method comprising:

selecting said at least one procedure from a group of procedures including one of a first procedure including substantially aligning said first display window to display a chosen harmonica position indicia and determining at least one note location corresponding to said harmonica position indicia displayed in said one or more chosen windows, and a second procedure including substantially aligning said first display window to display a chosen harmonica position indicia, and determining which of said at least one window reveals a chosen note location indicia; and, performing said at least one selected procedure with said display device.

* * * * *